United States Patent
Buzzard et al.

(10) Patent No.: US 10,156,865 B2
(45) Date of Patent: Dec. 18, 2018

(54) ANTI-ROTATION DEVICE FOR STEERING COLUMN

(71) Applicant: STEERING SOLUTIONS IP HOLDING CORPORATION, Saginaw, MI (US)

(72) Inventors: Donald A. Buzzard, Saginaw, MI (US); Chet A. Hickmott, Bay City, MI (US); Kathleen M. Brown, Bay City, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 853 days.

(21) Appl. No.: 14/568,206

(22) Filed: Dec. 12, 2014

(65) Prior Publication Data

US 2015/0168988 A1    Jun. 18, 2015

Related U.S. Application Data

(60) Provisional application No. 61/915,273, filed on Dec. 12, 2013.

(51) Int. Cl.
*G05G 5/04* (2006.01)
*B62D 1/16* (2006.01)

(52) U.S. Cl.
CPC .............. *G05G 5/04* (2013.01); *B62D 1/16* (2013.01); *Y10T 29/49826* (2015.01); *Y10T 74/20636* (2015.01)

(58) Field of Classification Search
CPC ...... G05G 5/04; B62D 1/16; Y10T 29/49826; Y10T 74/20636; Y10T 403/7018; Y10T 403/7026
See application file for complete search history.

(56) References Cited

U.S. PATENT DOCUMENTS

| | | | |
|---|---|---|---|
| 2,454,856 A | 11/1948 | Bible | |
| 2,483,111 A | 9/1949 | Spillman | |
| 3,679,244 A * | 7/1972 | Reddy | F16B 2/24 403/109.3 |
| 3,865,407 A | 2/1975 | Klassen | |
| 3,877,656 A * | 4/1975 | Suzaki | G03B 21/321 242/597.3 |
| 7,574,940 B2 * | 8/2009 | Ridgway | B62D 1/16 180/287 |
| 9,039,041 B2 * | 5/2015 | Buzzard | B62D 1/16 280/771 |

* cited by examiner

*Primary Examiner* — Paul N Dickson
*Assistant Examiner* — Joselynn Y Sliteris
(74) *Attorney, Agent, or Firm* — Cantor Colburn LLP

(57) ABSTRACT

An anti-rotation device includes a main body pin and a retaining element coupled to the main body pin. The retaining element includes an attachment body and at least one flexible member extending therefrom, and the at least one flexible member is configured to compress toward the attachment body when the retaining element is inserted into an anti-rotation pin opening of a steering column jacket.

9 Claims, 3 Drawing Sheets

(12) United States Patent US 10,156,865 B2

ANTI-ROTATION DEVICE FOR STEERING COLUMN

CROSS REFERENCE TO RELATED APPLICATION

This application claims the benefit of U.S. Provisional Application Ser. No. 61/915,273, filed Dec. 12, 2013, the contents of which are incorporated herein by reference thereto.

BACKGROUND OF THE INVENTION

The following description relates to an anti-rotation device, and in particular, an anti-rotation device for a steering column.

Anti-rotation pins may be used in the automotive industry as a means of maintaining a steering shaft orientation after assembly of the steering column to a vehicle until the steering column, shaft, and driveline connections have been completed. Some known anti-rotation pins include plastic inserts, which may create high "push in" and/or "pull out" efforts when installing and/or removing the pin from the column, due to interface edges on interacting components.

Anti-rotation devices heretofore have been difficult to remove easily from a column jacket without concern of sharp jacket edges along a perimeter of an anti-rotation pin's interacting component.

SUMMARY OF THE INVENTION

In one exemplary embodiment of the present invention, there is provided an anti-rotation device. The device includes a main body pin and a retaining element coupled to the main body pin. The retaining element includes an attachment body and at least one flexible member extending therefrom, and the at least one flexible member is configured to compress toward the attachment body when the retaining element is inserted into an anti-rotation pin opening of a steering column jacket.

In another exemplary embodiment of the present invention, there is provided a steering column. The steering column includes a tubular jacket comprising a wall and a first aperture extending through the jacket wall, a steering shaft oriented at least partially within the tubular jacket, the steering shaft comprising a wall and a second aperture extending through the steering shaft wall, and an anti-rotation device extending through the first and second apertures to facilitate limiting relative rotation between the tubular jacket and the steering shaft. The anti-rotation device includes a main body pin and a retaining element coupled to the main body pin. The retaining element includes an attachment body and at least one flexible member extending therefrom, and the at least one flexible member is configured to compress toward the attachment body when the retaining element is inserted into the first aperture.

In yet another exemplary embodiment of the present invention, there is provided a method of assembling an anti-rotation device. The method includes providing a main body pin, and providing a retaining element, the retaining element including an attachment body and at least one flexible member extending therefrom, the at least one flexible members configured to compress toward the attachment body when the retaining element is inserted into an anti-rotation pin opening of a steering column jacket. The method further includes coupling the retaining element to the main body pin such that the attachment body at least partially surrounds a portion of the main body pin.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
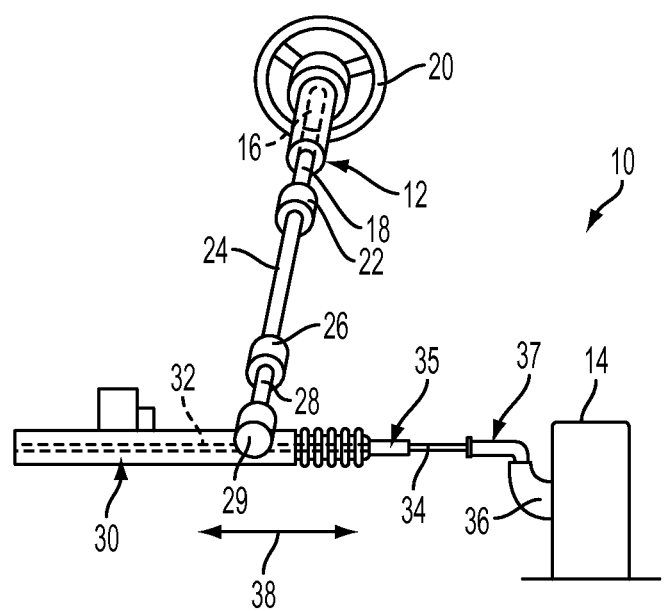
FIG. 1 is a schematic illustration of a steering system according to an exemplary embodiment of the present invention.

Referring now to the Figures, where the invention will be described with reference to specific embodiments, without limiting same, FIG. 1 shows a steering system 10 for use in a vehicle (not shown). Steering system 10 enables the operator of the vehicle to control the direction of the vehicle through the manipulation of a steering column 12, which is mechanically connected to road wheels 14 (only one shown).

Steering column 12 includes an upper column shaft 16 and a lower column shaft 18. A hand wheel 20 is disposed at upper column shaft 16 and is positioned so that the operator can apply a rotational force to steering column 12. A column universal joint 22 couples lower column shaft 18 to an intermediate shaft 24, which is secured at its other end to a lower column universal joint 26. A pinion shaft 28 is coupled at one end to universal joint 26 and to a pinion gear 29 of a steering gear assembly 30 at the other end. Gear assembly 30 also includes an elongate rack 32, and the opposed axial ends of rack 32 are coupled to the vehicle's road wheels 14 (only one shown) through steering linkage that includes tie rods 34 (only one shown) each secured to rack 32 at an inner tie rod end 35, and to one of a pair of steering knuckles 36 (only one shown) at an outer tie rod end 37.

When the vehicle operator turns hand wheel 20, a rotational force is applied to steering column 12 and pinion gear 29 is accordingly rotated. The movement of pinion gear 29 causes axial movement of rack 32 in the direction of arrows 38, which in turn manipulates tie rods 34 and knuckles 36 in order to reposition road wheels 14. Accordingly, when hand wheel 20 is turned, pinion gear 29 and a matching tooth portion (not shown) convert rotary motion of hand wheel 20 into linear motion of rack 32. In order to assist the operator-applied force to steering system 10, a motor (not shown) may be energized to provide power assist to the movement of rack 32, thereby aiding in the steering of the vehicle.

Figure 2:
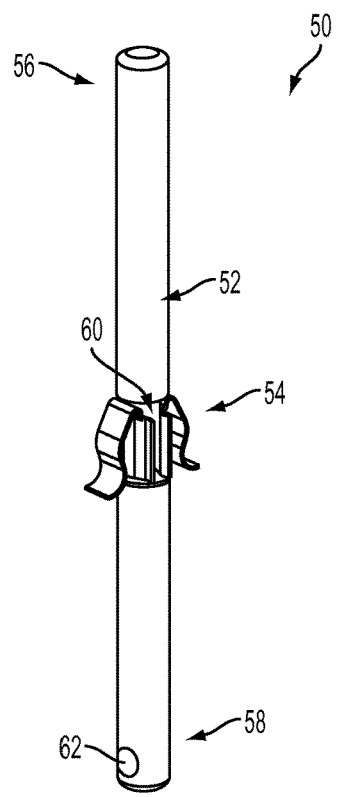
FIG. 2 is a perspective view of an anti-rotation device according to an exemplary embodiment of the present invention.
Figure 3:
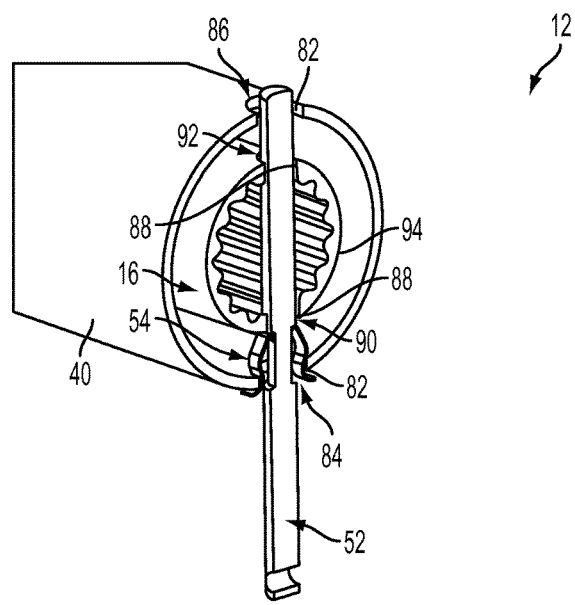
FIG. 3 is a cross-sectional view of the anti-rotation device shown in FIG. 2 and inserted into the steering system.

FIGS. 2 and 3 illustrate an exemplary anti-rotation device 50 that facilitates maintaining the orientation of steering column 12 during assembly of steering column 12 to the vehicle. As shown in FIG. 3, steering column 12 includes an upper jacket 40, which receives upper steering shaft 16 therein, and anti-rotation device 50 extends through upper jacket 40 and upper shaft 16 to maintain orientation therebetween, as described herein in more detail. Alternatively, device 50 may extend through lower shaft 18 and a lower jacket (not shown).

Anti-rotation device 50 generally includes a main body pin 52 and a retaining bushing or element 54.

Main body pin 52 includes a first end 56, a second end 58, and a portion 60 having a reduced cross-section collar compared to other portions of main body pin 52. Pin 52 may be generally cylindrical in shape and may be stamped from flat stock. In other embodiments, pin 52 may have any cross-sectional shape that enables anti-rotation device 50 to function as described herein. Pin second end 58 may also include an aperture 62 extending therethrough for attachment of an object (not shown) to aid in the removal of device 50 from steering column 12 (e.g., a zip tie).

Figure 4:
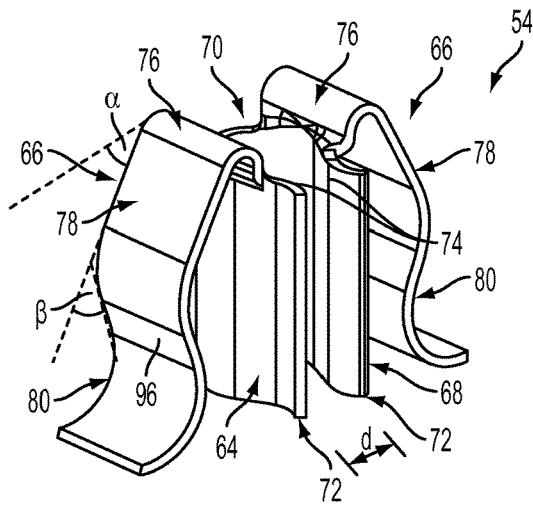
FIG. 4 is an enlarged perspective view of a retaining element shown in FIGS. 2 and 3 according to an exemplary embodiment of the invention.

With reference to FIG. 4, retaining element 54 includes an attachment body 64 and opposed clips or members 66 extending therefrom. Although illustrated with two members 66, retaining element 54 may have any number of members 66 (e.g., one or three). Attachment body 64 is generally tubular and includes a first end 68, a second end 70, and opposed attachment tabs 72. Each tab 72 includes a contact surface 74, and a distance 'd' between opposed contact surfaces 74 is smaller than a diameter or cross-section of reduced portion 60. Accordingly, retaining element 54 is coupled to pin 52 by placing contact surfaces 74 onto and around portion 60 such that tabs 72 flex outward away from each other until portion 60 is seated within attachment body 64. In this position, tabs 72 have flexed back towards each other to facilitate securing retaining element 54 about pin 60. Each clip 66 is coupled to attachment body second end 70 and includes a seating portion 76, an insertion portion 78, and a retention portion 80. In the exemplary embodiment, retaining element 54 is fabricated from metal. In other embodiments, retaining element 54 is fabricated from any suitable material that enables retaining element 54 to function as described herein.

Figure 5:
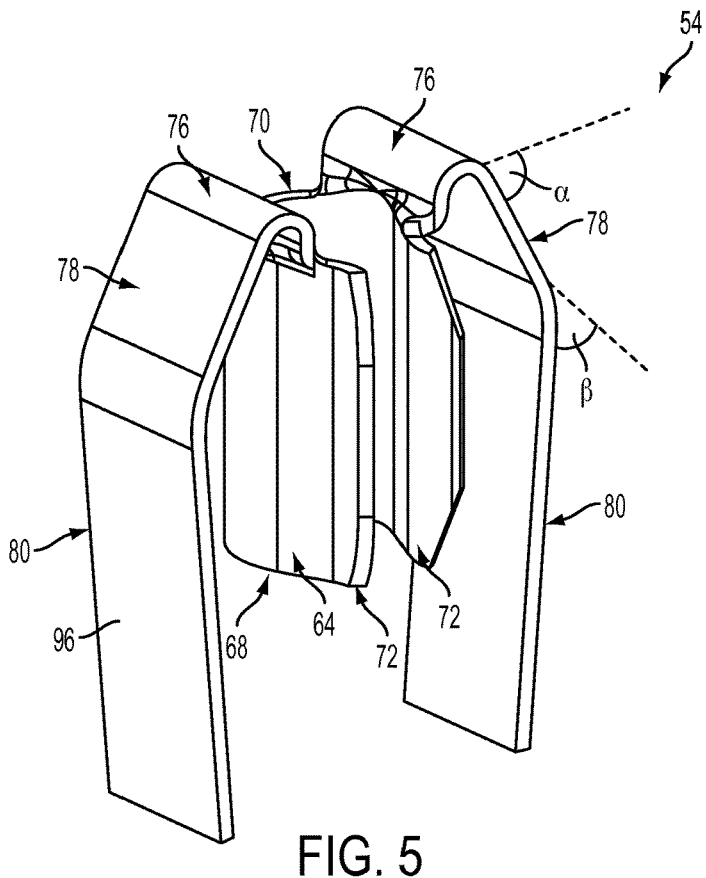
FIG. 5 is an alternative embodiment of the retaining element shown in FIGS. 2-4.

FIG. 5 illustrates an alternative embodiment of retaining element 54 that is similar to the retaining element shown in FIGS. 2-4, but includes alternatively shaped members 66 and attachment tabs 72.

With further reference to FIG. 3, upper jacket 40 includes inner walls 82 defining opposed anti-rotation pin openings 84 and 86, and, similarly, shaft 16 includes inner walls 88 defining opposed anti-rotation pin openings 90 and 92. During assembly of steering column 12, pin first end 56 is inserted in sequence through pin opening 84, pin opening 90, pin opening 92, and pin opening 86. Openings 84, 86, 90, 92 may have any suitable shape that enables device 50 to function as described herein. For example, openings 84, 86, 90, 92 may be round or slotted. In addition, there may be interacting features located at openings 84, 86, 90, 92.

As retaining element 54 passes through pin opening 84, insertion portions 78 contact inner wall 82 and members 66 are flexed inward toward each other to enable insertion portions 78 to pass through pin opening 84. In other embodiments, at least a portion of members 66 may flex or expand outward away from each other when passing through pin opening 84. Once insertion portions 78 pass inner wall 82 of pin opening 84, members 66 flex outward away from each other. In the exemplary embodiment, insertion portions 78 are oriented at an angle 'α', which is tunable (i.e., variable) to establish a desired "push in" force to insert anti-rotation device 50 into steering column 12. For example, as angle 'α' is increased, the force required to flex insertion portions 78 inward to pass through pin opening 84 is increased, and vice versa.

Main body pin 52 extends through pin openings 84, 86, 90, and 92 until clip seating portions 76 contact an outer surface 94 of upper steering shaft 16. In the exemplary embodiment, pin opening 84 is larger than pin opening 90 such that retaining element 54 may pass through pin opening 84 as described, but may not pass through pin opening 90 due to clip seating portions 76 contacting shaft outer surface 94, which prevents further insertion of pin 52.

As such, after pin 52 insertion, inner walls 82 are seated within and/or against retention portion 80, which facilitates preventing inadvertent removal of anti-rotation device 50. In the exemplary embodiment, retention portions 80 include a retention surface 96 oriented at an angle 'β', which is tunable (i.e., variable) to establish a desired tensile or "pull out" force to remove anti-rotation device 50 from steering column 12. For example, as angle 'β' is increased, the force required to flex insertion portions 78 inward to remove retaining element 54 from pin opening 84 is increased, and vice versa.

Once anti-rotation device 50 is seated as shown in FIG. 3, the relative orientation between upper shaft 16 and upper jacket 40 is maintained to facilitate assembly of steering column 12 to a vehicle. Retaining element 54 is fabricated from a suitable material (e.g., a metallic material such as steel) that facilitates easy removal of anti-rotation device 50 without concern of sharp edges on jacket 40 along a perimeter of pin openings 84 and 86. Further, when inserted into pin opening 84, members 66 compress until retaining element 54 is seated against jacket 40, at which point members 66 relax into their fully seated position against jacket 40. Since members 66 of metallic retaining element 54 have a far greater flexibility over that of a plastic element, tuning is easily accomplished. As such, the use of a slotted opening in jacket 40, to allow for misalignment of jacket 40 to shaft 16, is no longer required. An oversized opening (e.g., pin opening 84) may now replace a slotted opening and will allow pin 52 to be installed with element 54 rotated into any orientation and still have the flexibility to compensate for jacket to shaft misalignment.

Anti-rotation device 50 may designed to certain predefined tolerances. In some embodiments, for example, device 50 limits steering shaft 16 free rotation to between approximately 2 degrees and approximately 8 degrees clockwise and counterclockwise from the zero degrees steering shaft position. Device 50 may be designed to be capable of withstanding a steering shaft torsional load of approximately 40 Nm without exceeding approximately 15 degrees of the rotation from the zero degree steering shaft position and without permanent damage. Moreover, device 50 may be designed to be capable of being removed from steering column 12 by only pulling on pin 52 with a maximum force of approximately 45 N. Further, minimum retention forces of device 50 may be designed to be approximately 12 N, and device 50 is positioned in the upper head so device 50 can be removed after steering column 12 is installed in the cross car beam.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column comprising:
    a tubular jacket comprising a wall, a first jacket aperture extending through the jacket wall, and a second jacket aperture extending through the jacket wall, the second jacket aperture circumferentially spaced 180 degrees from the first jacket aperture and axially aligned with the first jacket aperture;
    a steering shaft oriented at least partially within the tubular jacket, the steering shaft comprising a steering shaft wall, a first shaft aperture extending through the steering shaft wall, and a second shaft aperture extending through the steering shaft wall, the second shaft aperture circumferentially spaced 180 degrees from the first shaft aperture and axially aligned with the first shaft aperture; and
    an anti-rotation device extending through the first and second jacket apertures and through the first and second shaft apertures to facilitate limiting relative rotation between the tubular jacket and the steering shaft, the anti-rotation device comprising:
        a main body pin; and
        a retaining element coupled to the main body pin, the retaining element comprising an attachment body and at least one flexible member extending therefrom, the at least one flexible member configured to compress toward the attachment body when the retaining element is inserted into the first jacket aperture.

2. The steering column of claim 1, wherein the at least one flexible member comprises a pair of flexible members extending from the attachment body.

3. The steering column of claim 1, wherein the retaining element is fabricated from a metallic material.

4. The steering column of claim 3, wherein the retaining element is fabricated from steel.

5. The steering column of claim 1, wherein the attachment body comprises a pair of attachment tabs and the attachment body is configured to flex the attachment tabs outward away from each other to fit over and around the main body pin.

6. The steering column of claim 1, wherein the main body pin comprises a first portion having a reduced cross-section relative to a second portion, the retaining element coupled to the reduced cross-section portion.

7. The steering column of claim 1, wherein each flexible member includes a seating portion configured to seat against a steering shaft located within the steering column jacket.

8. The steering column of claim 1, wherein each flexible member includes an insertion portion configured to engage a jacket inner wall that defines the first jacket aperture when the device is inserted into the first jacket aperture.

9. The steering column of claim 1, wherein each flexible member includes a retention portion configured to engage a jacket inner wall that defines the first jacket aperture to facilitate preventing removal of the retaining element from the first jacket aperture.

* * * * *